J. G. BACKSTROM.
CAR FENDER.
APPLICATION FILED FEB. 8, 1916.
1,198,311.
Patented Sept. 12, 1916.
2 SHEETS—SHEET 1.
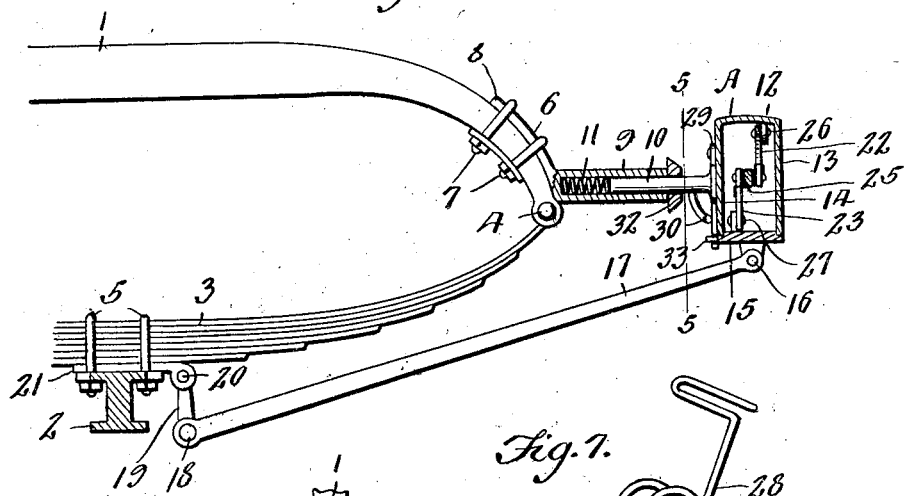
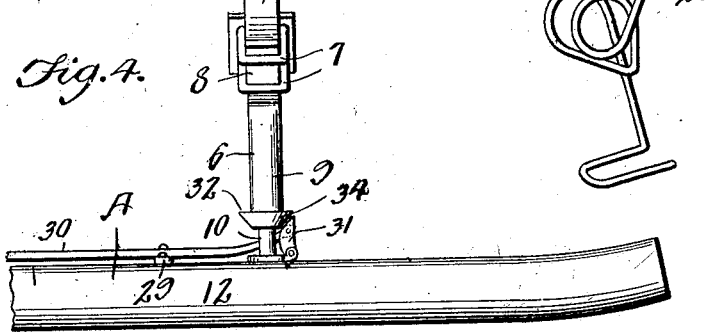
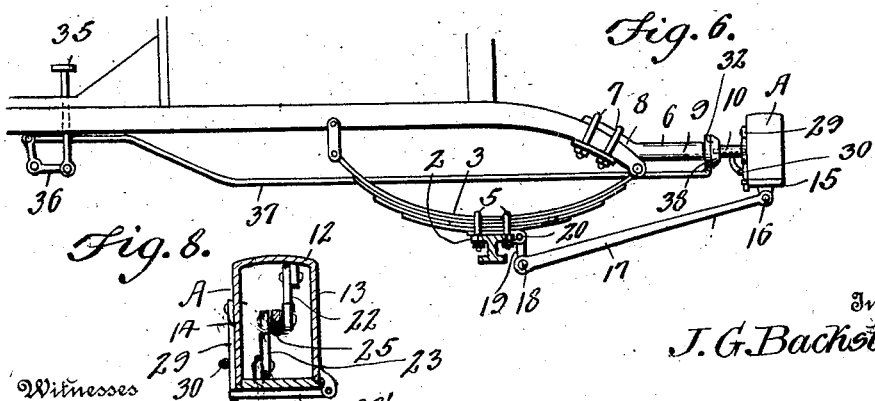
Witnesses
E. C. Andersen Jr.
R. M. Smith
Inventor
J. G. Backstrom,
By Victor J. Evans
Attorney

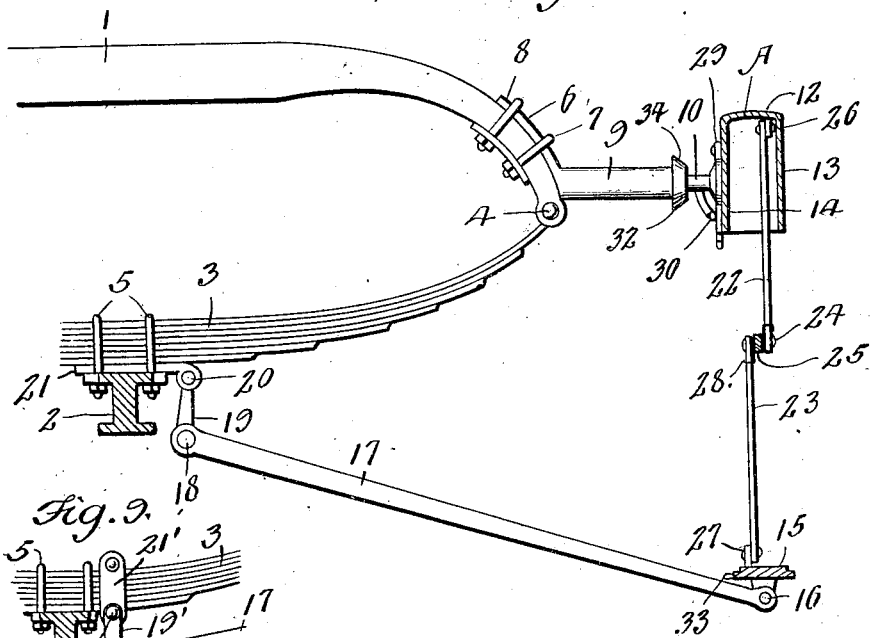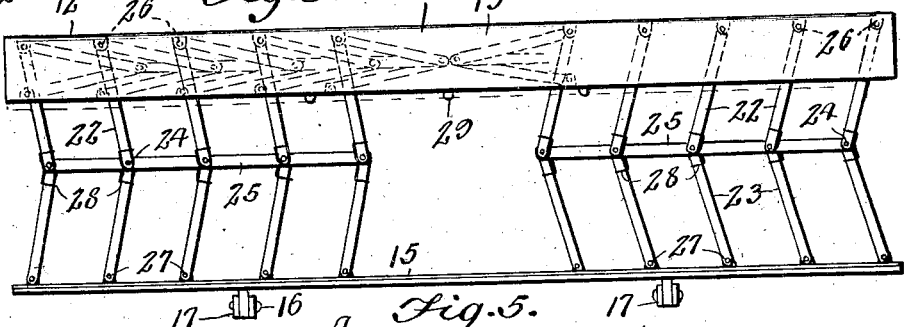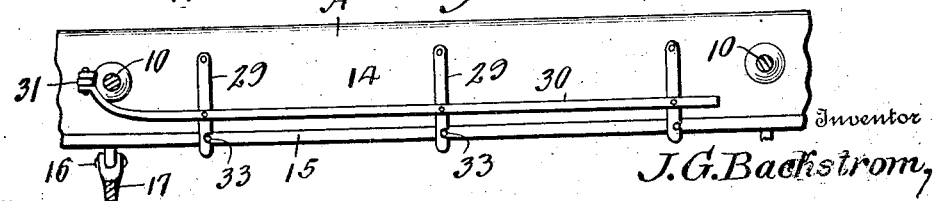

UNITED STATES PATENT OFFICE.

JOHN GARNER BACKSTROM, OF TUTWILER, MISSISSIPPI.

CAR-FENDER.

1,198,311.  Specification of Letters Patent.  Patented Sept. 12, 1916.

Application filed February 8, 1916. Serial No. 76,981.

*To all whom it may concern:*

Be it known that I, JOHN GARNER BACKSTROM, a citizen of the United States, residing at Tutwiler, in the county of Tallahatchie and State of Mississippi, have invented new and useful Improvements in Car-Fenders, of which the following is a specification.

This invention relates to car fenders, the object in view being to provide a fender especially designed for use upon motor vehicles such as automobiles, motor trucks and the like.

One of the main objects of the present invention is to produce a fender in which the body of the fender is normally collapsed in a compact condition and concealed within a housing which forms a pilot bar or bumper located in front of the machine and yieldingly related thereto so that the pilot bar is susceptible of a limited rearward movement, means being provided in connection therewith, whereby the body of the fender may be tripped and expanded to its useful position when the pilot bar strikes a person or object or when the driver of the machine finds it necessary or desirable to expand the fender, the fender thus being operable either automatically or manually.

With the above and other objects in view, the invention consists in the novel construction, combination and arrangement of parts, as herein described, illustrated and claimed.

In the accompanying drawings:—Figure 1 is a side elevation partly in section illustrating the fender of this invention in its applied relation to the frame and axle of a motor vehicle, the fender being shown in its folded or normal carrying position. Fig. 2 is a similar view showing the position assumed by the parts when the fender body is expanded to its useful position. Fig. 3 is a front elevation of the fender in its expanded or useful position. Fig. 4 is a fragmentary plan view of the fender. Fig. 5 is a vertical transverse section on the line 5—5 of Fig. 1 looking forwardly. Fig. 6 is a view similar to Fig. 1 but on a smaller scale, showing the manually operable means for tripping the fender. Fig. 7 is a detail view showing one of the springs for spreading the toggle links of the fender body. Fig. 8 is a fragmentary section showing a slight modification in the latch mechanism. Fig. 9 is a fragmentary side elevation partly in section showing another manner of fastening the support for the braces to the machine.

The fender of this invention is supported upon and connected to the side frame bars 1 of a motor vehicle, the fender being braced with relation to the front axle 2 of the vehicle, 3 designating the usual springs connected to the frame bars 1 by shackle bolts 4 and fastened to the axle 2 by means of the usual clips 5.

In carrying out the present invention, fender supporting brackets 6 are fastened to the forward extremities of the frame bars 1 of the vehicle by means of clips 7 or the equivalent thereof, each bracket comprising a curved body portion 8 which conforms to the curvature of the respective frame bar 1 and around which the clips or U-bolts 7 pass. Each bracket also comprises a forwardly extending and substantially horizontal tubular socket 9 which receives one of a pair of rods 10 fastened to the pilot bar hereinafter described and extending rearwardly from said pilot bar, the rods 10 being guided within the sockets 9 and being held at the forward limit of their movement by means of coiled expansion springs 11 located in the sockets 9 behind the rods 10. Any suitable means may be employed for limiting the forward movement of the rods 10. The springs 11 thus serve to sustain the pilot bar at the forward limit of its movement and also adapt said pilot bar to move rearwardly a limited distance for a purpose which will hereinafter appear.

The pilot bar designated generally at A comprises a top section 12 embodying a front wall 13 and a rear wall 14, the depth of the top section 12 of the pilot bar being sufficient to form a housing for the collapsible fender body hereinafter more particularly described. In addition to the top fender bar section 12, the pilot bar comprises a bottom section 15 having pivotally connected thereto at 16 the forward extremities of a pair of pivotal braces 17. The rear extremities of the braces 17 are pivotally connected at 18 to the lower extremities of hangers 19 which are in turn pivotally connected at 20 to attaching plates 21 fastened to the axle 2. As shown, each of the plates 21 is interposed and clamped between the adjacent vehicle spring 3 and the axle by means of the clips or bolts 5. The hangers 19 allow the braces 17 to swing rearwardly in order that the bottom section 15 of the fender bar may be moved downwardly in a substantially vertical line.

The body of the fender is composed of an upper set of links designated at 22 and a lower set of links designated at 23, all of said links being arranged in pairs and being pivotally connected together at 24 and also connected by the same pivots to a yoke bar 25 which therefore causes all of the links to swing equally in the operation of raising or lowering the fender body. The links of the upper set are connected by pivots 26 to the top pilot bar section 12 while the lower links are connected by pivots 27 to the bottom pilot bar section 15. It is also preferred to employ two groups of links as shown in Fig. 3, one at the right and the other at the left of the center of the pilot bar thereby providing for the movement of the yokes 25 toward each other in the folding movement of the fender body.

In order to assist in the expansive movement of the fender, each of the pivots 24 has associated therewith a coiled spring 28 the tension of which is exerted to throw the upper and lower sets of links 22 and 23 substantially into alinement with each other thus assisting in the quick and almost instantaneous expansion of the fender from its folded position to its catching or useful position.

The bottom section 15 of the pilot bar is normally upheld in the position shown in Fig. 1 by means of a plurality of latches 29, three of said latches being shown although the number thereof is immaterial. All of the latches are simultaneously operated by means of a common operating rod which is connected at one end to a cam lever 31 pivotally mounted on the upper fender bar section 12 at the rear side of the latter as illustrated, for instance, in Fig. 4. Mounted upon the rods 10 are slidable collars 32 which are adapted to coöperate with the cam levers 31 to move the rod 30 longitudinally and shift the catches 29 out of engagement with shoulders 33 on the lower section 15 of the pilot bar in order to release the latter and permit the same to fall. The slidable collars 32 are arranged just in front of the tubular sockets 9 and therefore when the pilot bar is thrust rearwardly upon impact with a person or object, the lever 31 is acted upon by the cam faces 34 of the collars 32, resulting in the tripping of the latches and the dropping of the fender body.

In addition to the means hereinabove described providing for the automatic tripping of the fender, the fender may be tripped by manually controlled means consisting of a pedal 35 within reach of the operator in his seat in the machine, the pedal 35 being shown as connected to a bell crank lever 36 under the floor of the vehicle and having attached thereto one end of a push rod 37, said rod having at its forward extremity a ring 38 which surrounds the adjacent rod 10 and lies behind the adjacent slidable collar 32. When the operator depresses the pedal 35, the connections referred to operate to thrust the collar 32 toward the pilot bar A causing the cam face 34 to operate against the lever 31 and thereby trip the latches and release the bottom section of the pilot bar which thereupon quickly falls, the descent thereof being accelerated by the springs 28 above described.

The operation of the fender is as follows. The body of the fender is normally housed within the top section 12 of the pilot bar A and the bottom of the housing is normally closed by means of the bottom section 15. Should the pilot bar strike a person or object, it moves rearwardly sufficiently to operate the latches 29 which immediately release the bottom section 15 of the pilot bar permitting the fender to expand to its useful position where it is sustained by means of the braces 17, the rear extremities of which are permitted to move rearwardly in order that the expanding fender may move downwardly in a substantially vertical path whereupon the rear extremities of the braces 17 contact with the axle 2 and are prevented from moving farther in a rearward direction. Should the driver see the necessity of using the fender, he may manually trip the same by depressing the pedal 35 which, by means of the connections described, will trip the latches 29 and release the bottom section of the pilot bar, whereupon the same action previously described will take place. The parts of the fender are restored to their carrying positions by hand after the fender has performed the service for which it was intended.

Instead of employing the plate 21 between the front axle 2 and the spring 3, the construction illustrated in Fig. 9 may be resorted to, the pin 20' of the hanger 19' being carried by a clip 21' which embraces the spring 3 adjacent to the front axle.

Having thus described my invention, I claim:—

1. The combination with the frame of a motor vehicle, of a yieldable pilot bar located in advance of said frame and having a limited rearward movement, said pilot bar being of hollow formation and comprising a top section which forms a housing for the body of the fender, and a bottom section forming a bottom closure for said housing, a fender body comprising a set of toggle links attached to the top pilot bar section, another set of toggle links attached to the bottom pilot bar section, said sets of links being pivotally yoked together and serving to limit the downward movement of the bottom pilot bar section, pivotal braces attached at their forward extremities to the last named section and connected at their rear extremities with the vehicle axle, and latching means sustaining the bottom pilot bar section in its elevated position and adapted to automatically release the last named section when the pilot bar is thrust rearwardly.

2. The combination with the frame of a motor vehicle, of a yieldable pilot bar located in advance of said frame and having a limited rearward movement, said pilot bar being of hollow formation and comprising a top section which forms a housing for the body of the fender, and a bottom section forming a bottom closure for said housing, a fender body comprising a set of toggle links attached to the top pilot bar section, another set of toggle links attached to the bottom pilot bar section, said sets of links being pivotally yoked together and serving to limit the downward movement of the bottom pilot bar section, pivotal braces attached at their forward extremities to the last named section and connected at their rear extremities by pivoted hangers with the vehicle axle, and latching means sustaining the bottom pilot bar section in its elevated position and adapted to automatically release the last named section when the pilot bar is thrust rearwardly.

3. The combination with the frame of a motor vehicle, of a yieldable pilot bar located in advance of said frame and having a limited rearward movement, said pilot bar being of hollow formation and comprising a top section which forms a housing for the body of the fender, and a bottom section forming a bottom closure for said housing, a fender body comprising a set of toggle links attached to the top pilot bar section, another set of toggle links attached to the bottom pilot bar section, said sets of links being pivotally yoked together and serving to limit the downward movement of the bottom pilot bar section, pivotal braces attached at their forward extremities to the last named section and connected at their rear extremities with the vehicle axle, a plurality of latches on the pilot bar for upholding the bottom pilot bar section, a latch operating rod for simultaneously actuating said latches, a cam lever to which said rod is attached, and means in rear of the pilot bar for operating said cam lever when the pilot bar is thrust rearwardly.

4. The combination with the frame of a motor vehicle, of a yieldable pilot bar located in advance of said frame and having a limited rearward movement, said pilot bar being of hollow formation and comprising a top section which forms a housing for the body of the fender, and a bottom section forming a bottom closure for said housing, a fender body comprising a set of toggle links attached to the top pilot bar section, another set of toggle links attached to the bottom pilot bar section, said sets of links being pivotally yoked together and serving to limit the downward movement of the bottom pilot bar section, pivotal braces attached at their forward extremities to the last named section and connected at their rear extremities with the vehicle axle, a plurality of latches on the pilot bar for upholding the bottom pilot bar section, a latch operating rod for simultaneously actuating said latches, a cam lever to which said rod is attached, and manually controlled means in rear of the pilot bar for operating said cam lever from the driver's seat when the pilot bar is thrust rearwardly.

In testimony whereof I affix my signature in presence of two witnesses.

JOHN GARNER BACKSTROM.

Witnesses:
  A. F. ROBARDS,
  W. WILLIS.